(12) United States Patent
Nysted

(10) Patent No.: US 12,214,924 B2
(45) Date of Patent: Feb. 4, 2025

(54) METHOD OF OPENING AN OUTER BAG OF A PRE-FILLED DOUBLE-BAG AND AN OPENING DEVICE THEREFORE

(71) Applicant: PanPac Engineering A/S, Pandrup (DK)

(72) Inventor: Morten Nysted, Pandrup (DK)

(73) Assignee: PANPAC ENGINEERING A/S, Pandrup (DK)

( * ) Notice: Subject to any disclaimer, the term of this patent is extended or adjusted under 35 U.S.C. 154(b) by 0 days.

(21) Appl. No.: 18/547,389

(22) PCT Filed: Mar. 4, 2022

(86) PCT No.: PCT/EP2022/055511
§ 371 (c)(1),
(2) Date: Aug. 22, 2023

(87) PCT Pub. No.: WO2022/194567
PCT Pub. Date: Sep. 22, 2022

(65) Prior Publication Data
US 2024/0124182 A1    Apr. 18, 2024

(30) Foreign Application Priority Data
Mar. 16, 2021  (DK) ............................... PA202170119

(51) Int. Cl.
*B65B 69/00*    (2006.01)
*B23K 26/402*   (2014.01)
(Continued)

(52) U.S. Cl.
CPC ............ *B65B 69/00* (2013.01); *B23K 26/402* (2013.01); *B65B 57/02* (2013.01); *B65B 59/003* (2019.05)

(58) Field of Classification Search
None
See application file for complete search history.

(56) References Cited

U.S. PATENT DOCUMENTS

| | | | |
|---|---|---|---|
| 6,775,959 B1 * | 8/2004 | Lasson | B65D 5/065 |
| | | | 53/133.1 |
| 2012/0213620 A1 * | 8/2012 | Marovic | B65D 31/02 |
| | | | 414/412 |
| 2020/0341453 A1 * | 10/2020 | Edwards | G06V 10/75 |

FOREIGN PATENT DOCUMENTS

| | | | |
|---|---|---|---|
| CN | 106809512 A | * | 6/2017 |
| CN | 108082630 A | | 5/2018 |

(Continued)

OTHER PUBLICATIONS

International Search Report dated Jun. 27, 2022 (4 pages) from PCT Priority Application PCT/EP2022/055511 filed Mar. 4, 2022.
(Continued)

*Primary Examiner* — Chinyere J Rushing-Tucker
(74) *Attorney, Agent, or Firm* — Crowell & Moring LLP; John C. Freeman

(57) ABSTRACT

A method of opening an outer bag of a pre-filled double-bag including a bag content and an opening system. A wall of the outer bag includes a cellulose-based material and a wall of the inner bag may include a plastic-based material enclosing an inner compartment including the bag content.

The method may include an opening operation performed by the opening system, so as to open the outer bag leaving the inner bag substantially intact.

The opening system may include a laser arrangement including one or more laser units emitting laser light having wavelengths in the range of 7-13 µm. The opening operation may include acts of exposing a wall area of the outer bag to the laser light, so as to at least provide a perforation of the outer bag in the exposed wall area.

10 Claims, 3 Drawing Sheets

(51) Int. Cl.
B65B 57/02 (2006.01)
B65B 59/00 (2006.01)

(56) References Cited

FOREIGN PATENT DOCUMENTS

| EP | 0 864 499 A1 | 9/1998 |
| EP | 1 329 388 B1 | 6/2006 |
| JP | H4-173531 A | 6/1992 |
| JP | 2017/065793 A | 4/2017 |
| NZ | 335620 A | 10/2000 |
| WO | WO 2008/016313 A1 | 2/2008 |
| WO | WO 2011/053165 A1 | 5/2011 |
| WO | WO 2015/134698 A1 | 9/2015 |

OTHER PUBLICATIONS

Written Opinion dated Jun. 27, 2022 (8 pages) from PCT Priority Application PCT/EP2022/055511 filed Mar. 4, 2022.
Office Action dated Sep. 16, 2021 from Danish priority PA 2021 70119 (13 pages).

\* cited by examiner

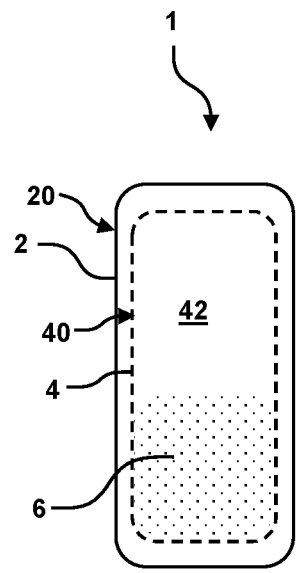
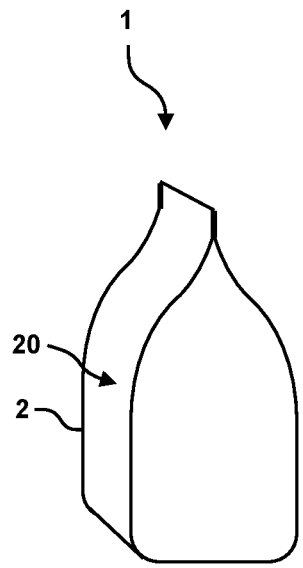
Fig. 1          Fig. 2
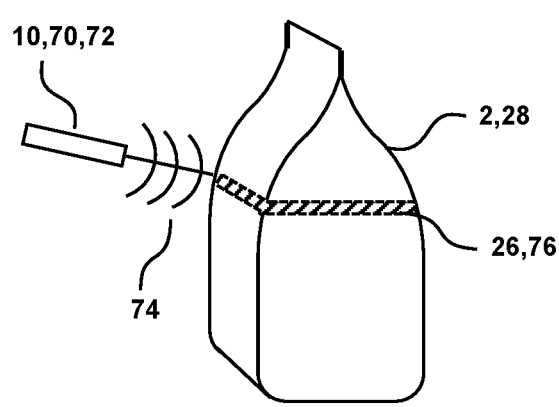
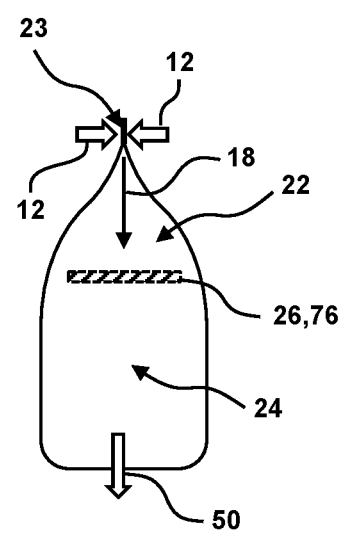
Fig. 3          Fig. 4

METHOD OF OPENING AN OUTER BAG OF A PRE-FILLED DOUBLE-BAG AND AN OPENING DEVICE THEREFORE

This application is a National Stage application of International Application No. PCT/EP2022/055511, filed Mar. 4, 2022, the entire contents of which are incorporated herein by reference.

This application claims priority under 35 U.S.C. § 119 (a) to Danish Patent Application No. PA202170119, filed on Mar. 16, 2021, the entire contents of each of which are incorporated herein by reference.

BACKGROUND OF THE INVENTION

Technical Field

The invention relates to a method of opening an outer bag of a pre-filled double-bag comprising a bag content and an opening system therefore. The wall of the outer bag comprises a cellulose-based material and the wall of the inner bag may comprise a plastic-based material enclosing an inner compartment comprising the bag content.

The method may include an opening operation performed by means of the opening system, so as to open the outer bag leaving the inner bag substantially intact.

The opening system may comprise a laser arrangement comprising one or more laser units emitting laser light having wavelengths in the range of 7-13 um (microns) such as in the range of 9-11 um (microns). The opening operation may comprise acts of exposing a wall area of the outer bag to the laser light, so as to at least provide a perforation of the outer bag in said exposed wall area.

The method may support automated handling and opening of the double bags and the opening system may be an automated system. The method and the opening system may be implementable in or with existing in-line systems for handling pre-filled double bags in production facilities using ingredients provided in double-bags.

Background Art

Open mouth bags are bags used in the packaging industry that are factory closed on one side of the tube, and closed by sewing or sealing on the other side. The materials, construction, and characteristics of open mouth bags vary widely, making them suitable for diverse applications ranging from bulk solids and fertilizer, to seed and pet food.

Double bags of the open mouth bag types comprising an outer bag made of a cellulose-based material and an inner bag made of a plastic-based material may commonly by used in the food and pharma industries for storing and transporting ingredients for later processing. The inner bags main purpose is to store the ingredients in a safe and optimal manner e.g. to avoid hydration and contamination and provide a sufficient high hygienic level. The outer bags is used as a protective layer during transport, such that the inner bag is protected from tearing, and used as a filth or soil layer protecting the inner bag from being soiled.

Preferably, the outer bag is removed from the inner bag prior to entering the content still comprised in the inner bag into a subsequent manufacturing process or a different part of the manufacturing plant, which could for example be a process or part categorized as high-level hygienic.

Usually, the double bags are closed in both ends using an adhesive, and in a manner where the filled and closed double bags can be handled without the risk of opening or tearing the outer bag during transportation or storage. In addition, the double bags may comprise a treaded-opening, which comprises a coarse thread woven into the cellulose-based material for opening the outer bag by pulling the thread. The threaded-opening should be implemented in a manner, such that the bags can be handled during transportation and storage again without the risk of opening or tearing the outer bag during transportation and/or storage.

When the ingredient comprised in the inner bag are to be used in the manufacturing process, the outer bag is removed from inner bag and discarded of by a manual operation, which typically includes using a knife for cutting the outer bag open, and manually removing the outer bag. The remaining part with the inner bag comprising the ingredient(s) is subsequently forwarded to a next step and/or position in the process or plant for further processing.

One objective of this disclosure is to overcome one or more of the before mentioned shortcomings of the prior art.

A further objective is to achieve a method of opening an outer bag of a pre-filled double-bag, which method may support automated handling and opening of the double bags.

Yet another objective is to achieve an opening system for opening an outer bag of a pre-filled double-bag. One further objective is to achieve an opening system implementable in or with existing systems using ingredients provided in double-bags.

Yet a further objective is to achieve a method and an opening system being implementable in or with existing in-line systems for handling pre-filled double bags in production facilities using ingredients provided in double-bags.

SUMMARY OF THE INVENTION

Disclosed herein is a method of opening an outer bag of a pre-filled double-bag comprising a bag content. The double-bag may comprise the outer bag separated from an inner bag with the inner bag arranged inside the outer bag.

The wall of the outer bag comprises a cellulose-based material and the wall of the inner bag may comprise a plastic-based material enclosing an inner compartment comprising the bag content.

The method may comprise acts of providing the pre-filled double-bag and providing an opening operation by means of an opening system, so as to open the outer bag leaving the inner bag substantially intact.

The opening system may comprise a laser arrangement comprising one or more laser units emitting laser light having wavelengths in the range of 7-13 um (microns).

In one aspect, the emitted laser light may have wavelengths in the range of 9-11 um (microns).

The opening operation may comprise an act of exposing a wall area of the outer bag to the laser light so as, to at least provide a perforation of the outer bag in said exposed wall area.

The multi-layered bag may be of the type commonly known as an open mouth bag comprising an inner layer bag body being the inner bag and an outer layer bag body being the outer bag.

The inner bag or the inner layer bag body may also be known as e.g. a liner or an inner liner.

The outer bag and hence, the wall of the outer bag may comprise multiple layers of cellulose-based material. Furthermore, one or more of the multiple layers of cellulose-based material may comprise a coating, which makes the cellulose-based layers moisture stable. The coating may be a wax or polish, a coating comprising wax or polish or a coating with comparable properties of reducing moisture absorption.

The method is directed to opening the outer bag or the bag proximate to the laser arrangement thus, the method may also be applied for opening open mouth bags with inner bags of a different material than plastic-based material.

The method may be applied to pre-filled double-bags being freely suspended or pre-filled double-bags resting on a support.

The inner bag may be permeable, semi-permeable or non-permeable depending on the bag content to be stored. The bag content may be an ingredient for a later processing i.e. a food ingredient to be processed in a plant for a semi-fabricate or a finished end product, for repackaging from large packaged portions to smaller packaged portions, for processing in the pharma industry. These are examples of some industries working under restrictions, such as high-level hygienic standards for the items entering the production facilities. The examples are meant as such and do not limit the field of application hereto.

The permeability may be defined in relation to general fluid permeability, air- or specific gas-permeability. E.g. double-bags comprising milk powder may comprise a non-permeable inner bag of a food-grade plastic material.

The achieved perforation may comprise multiple separate points or a coherent line forming an elongated slit in the outer bag wall. The perforation may be a fully through-going perforation or a perforation only going partly through the outer wall.

The laser arrangement may comprise one or more lasers units. The one or more lasers may a pulsed laser (PWM, pulsed width modulated), a continuous wave laser (CW, constant wave), line beam or focused beam laser or any combination hereof.

The perforation of the outer bag is achieved due to that the cellulose-based material absorbs the laser light and hence burns or evaporated the cellulose-based material.

In one aspect, the inner bag is not affected by the laser light because the emitted laser light is absorbed by the outer bag, and thus the laser light do not reach the inner bag and is therefore left substantially intact. I.e. the laser arrangement is controlled to only emit sufficient power to perforate the outer bag and hence the emitted laser light is stopped once the outer bag is perforated.

In another aspect, the inner bag do not absorb the laser light with the specified wavelengths or do not absorb the laser light with the specified wavelengths to the same degree as the cellulose-based material of the outer bag.

Hence, the opening arrangement will not, at least to the same degree, affect the inner bag when compared to the outer bag. Thereby, the method according to the present disclosure may result in a solution, which provides, or helps to provide, an opening of the outer bag without the inner bag being opened.

The output power of the laser and the exposure time should be carefully adjusted to the outer bag in consideration of the specific material, layers and wall thickness, such that the absorbed energy is sufficient for achieving a perforation of the outer bag with the applied wavelength. Furthermore, the output power of the laser and the exposure time should be carefully adjusted to the inner bag in consideration of the specific material, such that any absorbed energy is not sufficient for perforating the inner bag with the applied wavelength.

This adjustment may be achieved by an initializing routine comprising acts of receiving input of the outer bag and operating the laser arrangement based on the received input.

The laser arrangement may alternatively be operated based on received input from a feedback system. The feedback system may be vision based and provide a surface temperature of the exposed wall area during the opening operation such that the laser arrangement may be controlled based on temperature input.

Alternatively, the laser arrangement med by operated based on a combination of an initializing routine and a feedback system e.g. according to the above disclosed initializing routine and/or feedback system.

In one aspect, the laser arrangement may be arranged, such that any emitted beams are relatively angled to avoid crossing each other at any point to avoid focus points with an excessive energy concentration both in regard to safety and for unintended energy absorption in other areas than the intended exposed wall area.

In one aspect of the method, the laser light may be provided in more wall areas simultaneous or in the same wall area in multiple successive steps or rates.

The outer bag may be separated from the inner bag. In this context, separated may be considered that the inner and outer bag are two separate items, which may be releasable attached to each other by use of an adhesive e.g. glue.

The method may be implemented in any suitable existing system or in a system retrofitted hereto.

In one embodiment of the method, the laser arrangement may emits laser light having wavelengths in the range of 9.2-9.8 um (microns) and/or 10-10.8 um (microns).

In one aspect, the laser light may comprise wavelengths of 10.6 um (microns).

In one aspect, the laser light may comprise wavelengths of 10.2 um (microns).

In one aspect, the laser light may comprise wavelengths of 9.3 um (microns)

In one embodiment of the method, the opening system may comprise a holding device adapted to hold the outer bag at a first wall part. The opening operation may comprise acts of holding the first wall part at one or more holding points using the holding device and applying an external force to a second wall part of the outer bag.

The first wall part and second wall part may be arranged on opposite sides of the perforation, and the applied external force may be applied in a force direction being in a direction from one of the one or more holding points towards a point in the perforation.

Thereby achieving, that the first wall part is separated and displaced from the second wall part at the perforation.

The external force may be applied during or after exposure of the outer bag to the laser light and hence during or after the perforation is formed. The external force should be adapted to the formed perforation such that applying the external force results in the separation and displacement of either of the two parts relative to each other.

The expression 'the first wall part is separated and displaced from the second wall part' is to be interpreted in a broad manner, i.e. the first and the second wall part is separated and displaced from each other either by displacing the first wall part, by displacing the second wall part or displacing both wall parts. This interpretation is to be generally applied throughout this disclosure, including the detailed disclosures accompanying the figures.

This embodiment may be directed to a method where the pre-filled double-bag is freely suspended at the one or more holding points, i.e. the pre-filled double-bag is suspended in free air without resting on a support or being supported in any other points.

Alternatively, this embodiment may be directed to a method where the pre-filled double-bag is supportedly suspended at the one or more holding points, i.e. the pre-filled double-bag is suspended at the one or more holding points and resting or being supported in one or more additional points; in particular, these additional one or more points may be comprised in the second wall part of the outer bag. For example, the double-bag may be laying on a support. This may be beneficial in case the strength of the inner bag is limited compared to the weight of the bag content, which may be subjected to the inner bag if freely suspended once the outer bag is partly or fully opened.

In one embodiment, the method may comprise an act of determining the thickness of the outer bag wall and/or the bag type to be processed by means of a sensor arrangement.

In one aspect, the sensor arrangement may comprise a QR or barcode sensor for reading information from a QR or bar code supplied on the double bag or on an accompanying label. This information may comprises the information of the outer bag wall thickness and or the specific material of the outer bag wall. Based on this information, the operation of the laser arrangement may be adjusted for achieving the perforation of the outer bag while leaving the inner bag substantially intact, as previously discussed.

Alternatively, the sensor arrangement may comprise an optical sensor unit to detect the thickness of the double bag in a particular point and based on the detected thickness, the application parameters may be determined.

Any alternative sensor unit configured for measuring the double bag thickness may be used, i.e. the holding device may comprise a sensor unit determining the thickness of the double bag at or around the holding point.

In one aspect, the opening system exposes the outer bag wall to laser light on a first side and a second side of the outer bag.

In one aspect, the laser arrangement may comprise a split-beam laser arrangement.

In one aspect, the laser arrangement comprises a first laser unit and a second laser unit. The first laser unit may be arranged at a first side of the bag, and the second laser unit may be arranged at a second opposing side of the bag.

Alternatively, the first and second laser units may be arranged after each other to expose the same area to laser light in two consecutive steps or to expose abutting, overlaying or neighbouring areas in a second step by the second laser unit to areas already exposed to laser light in a first step by the first laser unit.

In an alternative embodiment, the pre-filled double bag may be displaced or rotated such that the outer bag is exposed to laser light in two different wall areas by a single laser unit or by multiple laser units.

In one embodiment of the method, the opening operation may comprise providing a relative movement between the laser arrangement and the pre-filled double-bag during the opening operation. The relative movement may be provided by means of a displacement arrangement and a control system configured for operating the displacement arrangement.

This embodiment may support achieving a semi- or full-automated operated method for opening the pre-filled double-bag. Furthermore, achieving a semi- or full-automated method may provide for the method being implementable with any suitable existing automated system or in an automated system retrofitted hereto. This may include implementing the method in an automated in-line manufacturing process where the ingredient(s) comprised in the inner bag are to be used in the manufacturing process.

The control system may comprise a controller configured for operating drive units. The drive units may be comprised in the displacement arrangement or in the control system. The control system and the displacement arrangement may be incorporated in a single unit.

In one embodiment of the method, the laser arrangement comprises one or more $CO_2$ lasers.

In one aspect, the effect of laser light incident on the outer wall by a single laser beam may be in the range of 20-50 Watts, preferably 30-35 Watts. I.e. a pulsed laser with a high output effect (e.g. 100W) or non-focused high output lasers may be used.

The distance between the output aperture of the one or more laser units may be below 50 cm, such as in the range of 10-40 cm or in the range of 20-30 cm.

One effect of limiting the travelling distance of laser light in free air is to reduce any risk of unintended exposure to laser light of other items or persons operating the opening system or working around the system. Limiting the distance may reduce any need for implementing safety systems, barriers, screen enclosure etc.

In a further objective, an opening system for opening an outer bag of a pre-filled double-bag comprising a bag content is disclosed. The double-bag may comprise the outer bag separated from an inner bag with the inner bag arranged inside the outer bag.

The wall of the outer bag comprises a cellulose-based material and the wall of the inner bag may comprise a plastic-based material enclosing an inner compartment comprising a bag content.

The opening system may be configured for providing an opening operation wherein at least a first part of the outer bag is separated from a second part of the outer bag, such that the inner bag is exposed.

The opening system may comprise:
a laser arrangement comprising one or more laser units emitting laser light having wavelengths in the range of 7-13 um (microns) such as in the range of 9-11 um (microns);
a displacement arrangement for displacing the at least one of said one or more laser units and/or the double-bag to expose a wall area of the outer bag to said emitted laser light;
a control system adapted to received information of thickness of the outer bag wall and/or bag type to be processed and to control the emitted power from the laser arrangement to said wall area based on the received information of the thickness of the outer bag wall and/or the bag type to be processed, so as to at least provide a perforation of the outer bag in said exposed wall area.

The effects and advantages achieved with the disclosed opening system may generally be in accordance with the effects and advantages achieved by the disclosed method of opening a pre-filled double bag. The effects and advantages will therefore not be discussed or elaboration on in the following.

The opening system may be implemented as an add-on in or retrofitted into any existing production system, wherein ingredients comprised in pre-filled double bags are processed or in a system retrofitted hereto.

The opening system may be used with pre-filled double-bags being freely suspended or pre-filled double-bags resting on a support. By freely suspended is meant that the pre-filled double-bag is suspended in free air without resting on a support or being supported in any other points.

Alternatively, the opening system may be used with pre-filled double-bag supportedly suspended at the one or more holding points, i.e. the pre-filled double-bag is suspended at the one or more holding points and resting or being supported in one or more additional points. In particular, these additional one or more points may be comprised in the second wall part of the outer bag. For example, the double-bag may be laying on a support. This may be beneficial in case the strength of the inner bag is limited compared to the weight of the bag content, which may be subjected to the inner bag if freely suspended once the outer bag is partly or fully opened.

In one embodiment, the opening system may comprising a processing space, wherein the opening operation is configured to be provided, and wherein the system further comprises transportation means for transporting the prefilled double-bag to the processing space to be exposed to the opening operation.

One further effect of this embodiment may be to combine the opening system with or implement it into existing or new in-line processing systems, e.g. in-line processing systems with transport or conveyer systems for in-line handling of the double-bags and ingredient(s) comprised herein.

In one embodiment, the opening system may be configured to perform the acts of the disclosed method of opening an outer bag of a pre-filled double-bag.

In a further objective a use of a laser arrangement for opening an outer bag of a pre-filled double-bag comprising a bag content is disclose. The laser arrangement may comprise one or more laser units emitting laser light having wavelengths in the range of 7-13 um (microns) such as in the range of 9-11 um (microns). The double-bag may comprise the outer bag separated from an inner bag with the inner bag arranged inside the outer bag. The wall of the outer bag comprises a cellulose-based material and the wall of the inner bag may comprise a plastic-based material enclosing an inner compartment comprising the bag content. The use may include exposing a wall area of the outer bag to laser light so as to at least perforating the outer bag wall with a perforation.

The use of the laser arrangement may be with the laser arrangement incorporated in the disclosed opening system or parts hereof. The use of the laser arrangement may be according to the disclosed method of opening an outer bag of a pre-filled double-bag.

The effects and advantages achieved with the disclosed use of the laser arrangement may, generally be in accordance with the effects and advantages achieved by the disclosed method of opening a pre-filled double bag and/or the disclosed opening system. The effects and advantages will therefore not be discussed or elaboration on in the following.

The use of the laser arrangement may be implemented in any new or existing production system, wherein ingredients comprised in pre-filled double bags are processed or in a system retrofitted hereto.

In a further objective, a computer program is disclosed. The computer program may comprise instructions to cause the disclosed opening system to execute one or more of the acts of the disclosed method.

In a further objective, a computer-readable medium is disclosed. The computer-readable medium may have stored thereon the above disclosed computer program.

BRIEF DESCRIPTION OF THE DRAWINGS

Various examples are described hereinafter with reference to the figures. Like reference-numerals refer to like elements throughout. Like elements will thus, not be described in detail with respect to the description of each figure. It should be noted, that the FIGS. are only intended to facilitate the description of the examples. The figures are not intended as an exhaustive description of the claimed invention or as a limitation on the scope of the claimed invention. In addition, an illustrated example needs not have all the aspects or advantages shown. An aspect or an advantage described in conjunction with a particular example is not necessarily limited to that example and can be practiced in any other examples even if not so illustrated, or if not so explicitly described.

FIGS. 1 and 2 illustrates embodiments of a pre-filled double-bag with a bag content.

FIGS. 3 and 4 illustrates aspects of embodiments of the opening system.

Figure 5:
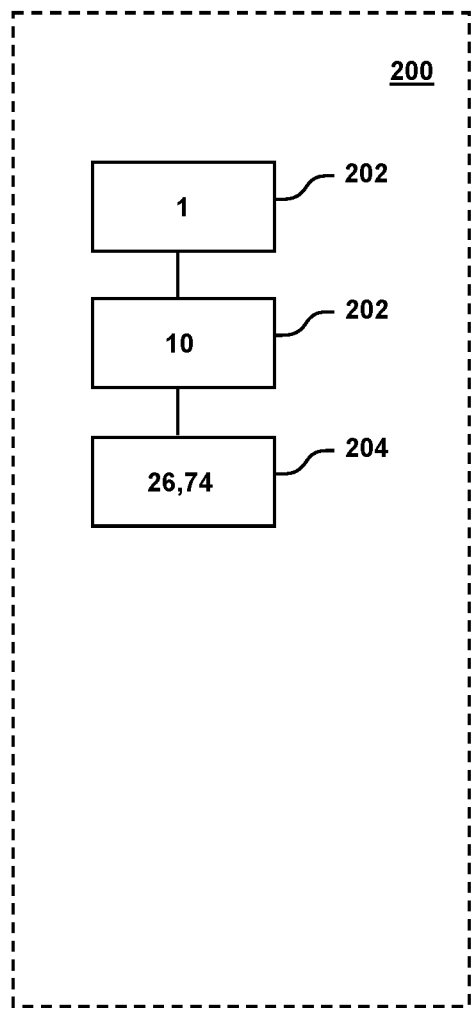
FIGS. 5 and 6 illustrates two embodiments of the method of opening a pre-filled double-bag.

| Detailed description | |
|---|---|
| No | Items |
| 1 | double-bag |
| 2 | outer bag |
| 4 | inner bag |
| 6 | bag content |
| 10 | opening system |
| 12 | holding device |
| 14 | grapping device |
| 18 | force direction |
| 20 | wall of the outer bag |
| 22 | first wall part |
| 23 | holding point |
| 24 | second wall part |
| 26 | wall area of the outer bag |
| 28 | wall thickness |
| 40 | wall of the inner bag |
| 42 | inner compartment |
| 50 | external force |
| 52 | sensor arrangement |
| 54 | transportation means |
| 56 | displacement arrangement |
| 58 | control system |
| 70 | laser arrangement |
| 72 | laser unit |
| 74 | laser light |
| 76 | perforation |
| 200 | method |
| 202 | providing |
| 204 | exposing |
| 208 | holding |
| 210 | applying |

Exemplary examples will now be described more fully hereinafter with reference to the accompanying drawings. In this regard, the present examples may have different forms and should not be construed as being limited to the descriptions set forth herein. Accordingly, the examples are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

In the drawings, when a layer, area, element, or plate is referred to as being "on" another layer, area, element, or plate, it may be directly on the other layer, area, element, or plate, or intervening layers, areas, elements, or plates may be present there between. Conversely, when a layer, area, element, or plate is referred to as being "directly on" another layer, area, element, or plate, there are no intervening layers, areas, elements, or plates there between. Further when a layer, area, element, or plate is referred to as being "below" another layer, area, element, or plate, it may be directly below the other layer, area, element, or plate, or intervening layers, areas, elements, or plates may be present there between. Conversely, when a layer, area, element, or plate is referred to as being "directly below" another layer, area, element, or plate, there are no intervening layers, areas, elements, or plates there between.

The spatially relative terms "lower" or "bottom" and "upper" or "top", "below", "beneath", "less", "above", and the like, may be used herein for ease of description to describe the relationship between one element or component and another element or component as illustrated in the drawings. It will be understood that the spatially relative terms are intended to encompass different orientations of the device in use or operation, in addition to the orientation depicted in the drawings. For example, in the case where a device illustrated in the drawings is turned over, elements described as being on the "lower" side of other elements, or "below" or "beneath" another element would then be oriented on "upper" sides of the other elements, or "above" another element. Accordingly, the illustrative term "below" or "beneath" may include both the "lower" and "upper" orientation positions, depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below, and thus the spatially relative terms may be interpreted differently depending on the orientations described.

Throughout the specification, when an element is referred to as being "connected" to another element, the element is "directly connected" to the other element, or "electrically connected" to the other element with one or more intervening elements interposed there between.

The terminology used herein is for the purpose of describing particular examples only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined in the present specification.

Exemplary examples are described herein with reference to cross section illustrations that are schematic illustrations of idealized examples, wherein like reference numerals refer to like elements throughout the specification. As such, variations from the shapes of the illustrations as a result, for example, of manufacturing techniques and/or tolerances, are to be expected. Thus, examples described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims. Some of the parts which are not associated with the description may not be provided in order to specifically describe exemplary examples of the present disclosure.

FIG. 1 illustrates one embodiment of the pre-filled double-bag 1 comprising a bag content 6. The double-bag comprises the outer bag 2 with the wall 20 and the inner bag 4 with the wall 40; the dashed line illustrates the inner bag 4. The inner bag 4 is arranged inside the outer bag 2. The wall 20 of the outer bag may comprise a cellulose-based material and the wall 40. The inner bag 4 encloses the inner compartment 42, wherein the bag content 6 is comprised.

FIG. 2 illustrates one embodiment of the double-bag 1 in a perspective view. The illustrated embodiment may be similar to that illustrated in FIG. 1. The double-bag comprises an outer bag 2 with a wall 20. The outer bag may be of a type commonly referred to as an open mouth bag type comprising an inner plastic liner. In the illustrated embodiment the double-bag is closed at the top end, which may be performed with a folding and glued end, stitched-type closure, stabled closure or similar or a combination hereof.

FIG. 3 illustrates one embodiment of the opening system 10 in the form of the laser arrangement 70. The figure illustrates the use of the laser arrangement 70 applying exposing a wall area 26 of the outer bag 2. The outer bag 2 is illustrated with a wall thickness 28.

The laser arrangement 70 comprises one or more laser units 72 emitting laser light 74. The laser light may emit light with wavelengths in the range of 7-13 um (microns) such as in the range of 9-11 um (microns).

FIG. 3 also illustrates the use of the laser arrangement 70 in the opening operation wherein a wall area 26 of the outer bag is exposed to the laser light 74, so as to at least provide a perforation 76 of the outer bag in said exposed wall area 26.

FIG. 4 illustrates one embodiment of the opening system comprising a holding device 12. The holding device 12 holds a first part 22 of the outer bag; here the upper part of the outer bag 2, in one or more holding points 23.

In the embodiment, an external force 50 is applied to the second part 24 of the outer bag, which is arranged on the opposite side of the perforation 76 to the first part 22.

The external force 50 is applied in a force direction 18 pointing from one of the one or more holding points 23 towards a point within the perforation 76, such that the second wall part 24 is separated and displaced from the first wall part 22 at the perforation 76. Thereby, opening the outer bag 2 and exposing the inner bag.

FIG. 5 illustrates one embodiment of the method 200 of opening an outer bag of a pre-filled double-bag 1. The embodiment comprises the acts of providing 202 the pre-filled double-bag 1 and providing 202 the opening operation by means of an opening system 10.

The opening system 10 may comprise a laser arrangement with one or more laser units emitting laser light having wavelengths in the range of 7-13 um (microns).

The opening operation comprises the act of exposing 204 a wall area 26 of the outer bag to the laser light 74, so as to at least provide a perforation of the outer bag in the exposed wall area 26.

Thereby achieving to at least partly open the outer bag leaving the inner bag substantially intact.

Figure 6:
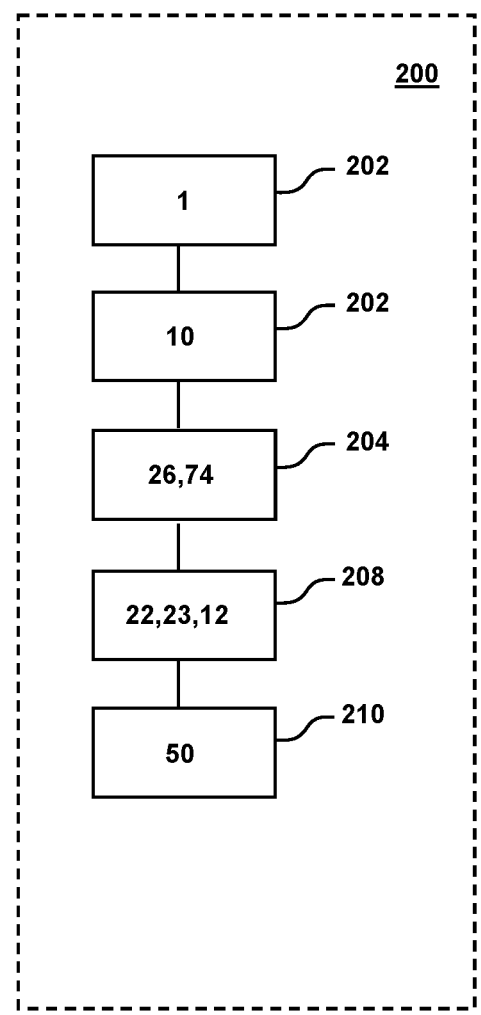

FIG. 6 illustrates another embodiment of the method 200 of opening an outer bag of a pre-filled double-bag 1. The illustrated embodiment comprises the acts illustrated in FIG. 5 and includes additional acts of holding 208 the first wall part 22 at one or more holding points 23 using the holding device 12 and applying 210 an external force 50 to the outer bag wall in order to separate and displace the first wall part and the second wall part from each other at the perforation.

Figure 7:
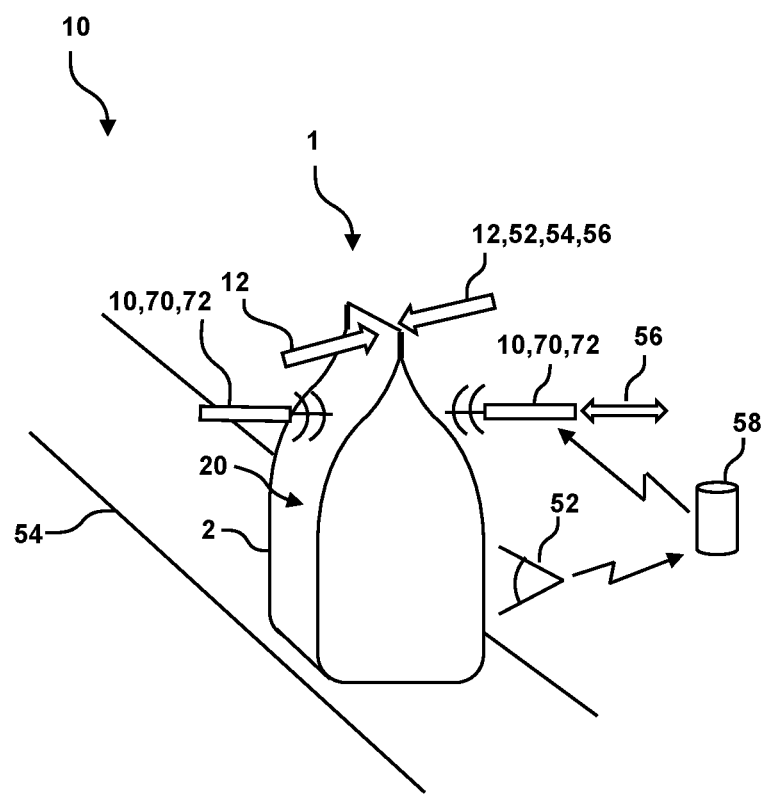
FIG. 7 illustrates one embodiment of an opening system

FIG. 7 illustrates one embodiment of the opening system 10 for opening the outer bag 2 of the pre-filled double-bag 1. The double-bag 1 is illustrated as seen in perspective view showing the wall 20 of the outer bag.

The opening system 10 is configured for providing the opening operation, wherein a wall area of the outer bag is perforated by incident laser light and wherein, at least a first part 22 of the outer bag 2 is separated from a second part 24 of the outer bag, such that the inner bag 4 is exposed.

The opening system 10 comprises a laser arrangement 70 comprising one or more laser units 72.

The opening system 10 furthermore comprises a holding device 12 for holding the first part 22 of the outer bag.

The opening system 10 furthermore comprises a displacement arrangement 56 for displacing the one or more laser units 72 and/or the double-bag 1 to expose a wall area of the outer bag to the emitted laser light.

The displacement arrangement 56 is configured for adjusting the double bag and/or one or more of the one or more laser units 72 relative to each other in lateral direction, in vertical direction, in a rotation direction to obtain an angled position between the double bag and one or more of the one or more laser units or a combination hereof. FIG. 7 only illustrates a lateral displacement for simplicity, however as described, the embodiment is not limited thereto. The displacement arrangement 56 may be incorporated with the holding device 12, with the laser arrangement 70 or both as illustrated.

The opening system 10 furthermore comprises a control system 58. The control system may be adapted to receive information of outer bag i.e. the thickness of the outer bag wall and/or the bag type to be processed. The control system 58 may furthermore be adapted to control the output power from the one or more laser units to the exposed wall area(s) based on the received information of the outer bag.

The opening system may also comprise a sensor arrangement 52 for detection of the outer bag thickness and/or the bag type. In the embodiment two sensor arrangements are illustrated e.g. an optical sensor reading information from the surface of the outer wall or a thickness sensor arranged in the holding device 12 for mechanically measuring the thickness of the double-bag (or folded double-bag) at the holding point.

The opening system 10 may be configured with a processing space wherein the opening operation is configured to be provided, and wherein the system further comprises a transporter that transports the prefilled double-bag 1 to the processing space to be exposed to the opening operation. The transporter may be in the form of a conveyer belt supporting and transporting the double-bag as illustrated. Alternatively, the transporter 54 may comprise the holding device 12 or be incorporated in the holding device 12 and thus the double-bag may be suspended from and transported by the transporter in a combination with the holding device 12.

The invention claimed is:

1. A method for opening an outer bag of a pre-filled double-bag comprising a bag content, the pre-filled double-bag comprising the outer bag separated from an inner bag with the inner bag being arranged inside the outer bag, wherein a wall of the outer bag comprises a cellulose-based material and a wall of the inner bag comprises a plastic-based material enclosing an inner compartment comprising the bag content, the method comprises:

providing the pre-filled double-bag; and providing an opening operation via an opening system, so as to open the outer bag leaving the inner bag substantially intact, wherein the opening system comprises a laser arrangement comprising one or more laser units emitting laser light comprising wavelengths in the range of 7-13 μm, and wherein the opening operation comprises exposing a wall area of the outer bag to the laser light, so as to at least provide a perforation of the outer bag in the wall area.

2. The method according to claim 1, wherein the laser light comprises wavelengths in the range of 9.2-9.8 μm and/or 10-10.8 μm.

3. The method according to claim 1, wherein the opening system comprises a holding device adapted to hold the outer bag at a first wall part, and wherein the opening operation comprises:

holding the first wall part at one or more holding points using the holding device; and applying an external force to a second wall part of the outer bag, the first wall part and the second wall part being arranged on opposite sides of a perforation, and an applied external force being applied in a force direction being in a direction from one of the one or more holding points towards a point in the perforation, such that the first wall part is separated and displaced from the second wall part at the perforation.

4. The method according to claim 1 comprising an act of determining a thickness of the outer bag wall and/or a bag type to be processed by a sensor arrangement.

5. The method according to claim 1, wherein the opening operation comprises providing a relative movement between the laser arrangement and the pre-filled double-bag during the opening operation, wherein the relative movement is provided by a displacement arrangement and a control system configured for operating the displacement arrangement.

6. The method according to claim 1, wherein the one or more laser units are one or more $CO_2$ lasers.

7. An opening system for opening an outer bag of a pre-filled double-bag comprising a bag content, the double-bag comprising an outer bag separated from an inner bag with the inner bag being arranged inside the outer bag, wherein a wall of the outer bag comprises a cellulose-based material and a wall of the inner bag comprises a plastic-based material enclosing an inner compartment (42) comprising a bag content (6), the opening system is configured for proving an opening operation wherein at least a first part of the outer bag is separated from a second part of the outer bag by a perforation such that the inner bag is exposed, the opening system comprises
- a laser arrangement comprising one or more laser units emitting laser light comprising having wavelengths in the range of 7-13 um,
- a displacement arrangement for displacing at least one of the one or more laser units and/or the double-bag to expose a wall area of the outer bag to the emitted laser light; and
- a control system adapted to received information of thickness of the wall of the outer bag wall and/or bag type to be processed and to control an emitted power from the laser arrangement to the wall area based on the received information of the thickness of the wall of the outer bag wall and/or a bag type to be processed, so as to at least provide a perforation of the outer bag in the said exposed wall area.

8. The opening system according to claim 7, comprising:
- a processing space wherein the opening operation is configured to be provided; and
- a transporter that transports the prefilled double-bag to the processing space to be exposed to the opening operation.

9. The opening system according to claim 7, wherein the opening system is configured to;
- provide the pre-filled double-bag; and
- provide an opening operation via an opening system, so as to open the outer bag leaving the inner bag substantially intact, wherein the opening system comprises a laser arrangement comprising one or more laser units emitting laser light comprising-wavelengths in the range of 7-13 μm, and wherein the opening operation comprises exposing a wall area of the outer bag to the laser light, so as to at least provide a perforation of the outer bag in the wall area.

10. Use of a laser arrangement for opening an outer bag of a pre-filled double-bag comprising a bag content, the double-bag comprising the outer bag separated from an inner bag with the inner bag being arranged inside the outer bag, wherein a wall of the outer bag comprises a cellulose-based material and a wall of the inner bag comprises a plastic-based material enclosing an inner compartment comprising the bag content, wherein the use comprises:
- exposing a wall area of the outer bag to laser light so as to at least perforate the outer bag wall with a perforation; and
- wherein the laser arrangement comprises one or more laser units emitting laser light comprising wavelengths in the range of 7-13 μm.

* * * * *